Figure 1:
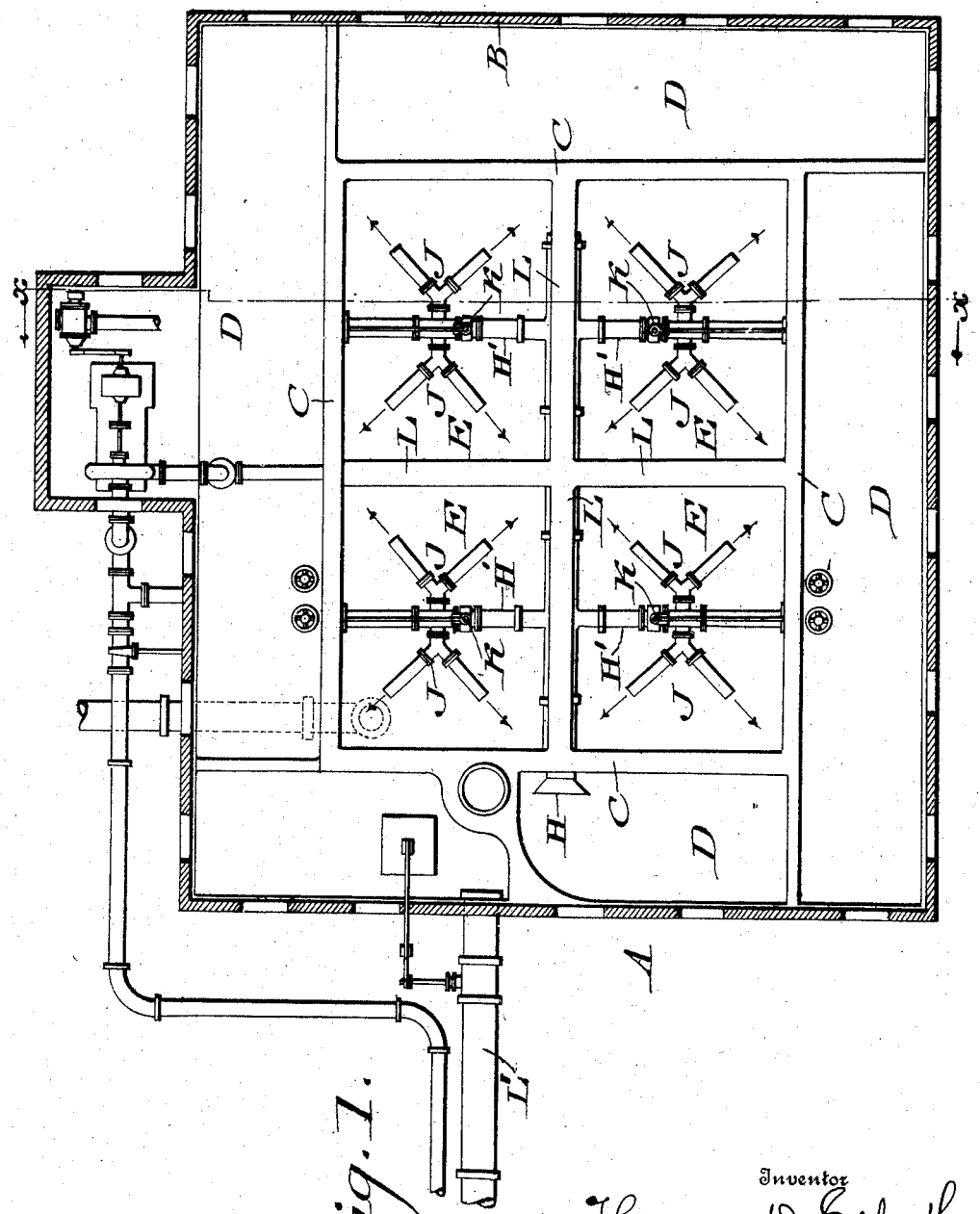

No. 866,346. PATENTED SEPT. 17, 1907.
H. D. ELFRETH.
FILTRATION PLANT.
APPLICATION FILED MAR. 1, 1907.

3 SHEETS—SHEET 1.

Witnesses
P. F. Nagle.
C. D. McVay.

Inventor
Harold D. Elfreth.
By Dredersheim + Fairbanks
Attorneys

No. 866,346.　　　　　　　　　　　　　　　PATENTED SEPT. 17, 1907.
H. D. ELFRETH.
FILTRATION PLANT.
APPLICATION FILED MAR. 1, 1907.

3 SHEETS—SHEET 2.

Fig. 2.

Witnesses
P. F. Nagle.
C. L. McVay.

Inventor
Harold D. Elfreth.
By Giedersheim + Faubaul
Attorneys

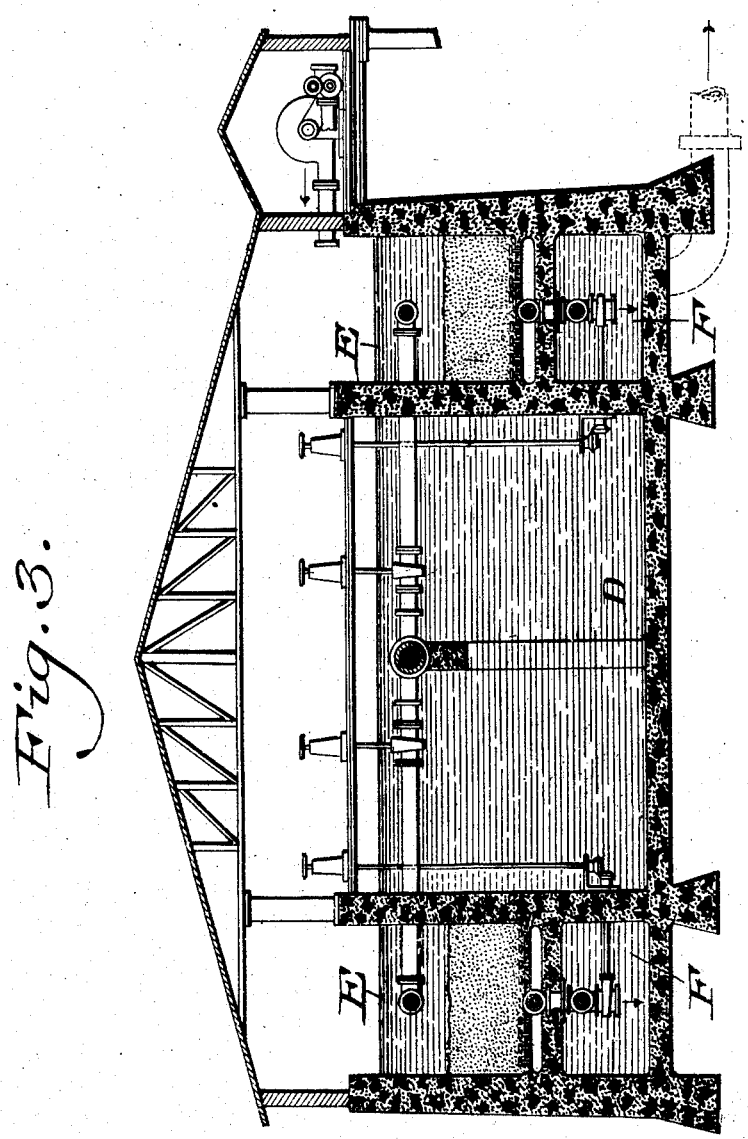

UNITED STATES PATENT OFFICE.

HAROLD D. ELFRETH, OF PHILADELPHIA, PENNSYLVANIA.

FILTRATION PLANT.

No. 866,346.        Specification of Letters Patent.        Patented Sept. 17, 1907.

Application filed March 1, 1907. Serial No. 360,037.

*To all whom it may concern:*

Be it known that I, HAROLD D. ELFRETH, a citizen of the United States, residing in the city and county of Philadelphia, State of Pennsylvania, have invented a new and useful Filtration Plant, of which the following is a specification.

My invention consists of a filtration plant embodying a sedimentation chamber, a filtering or number of filtering chambers, and a chamber for the reception of the clear or filtered water therefrom, the walls of the different chambers being common to all, thus avoiding the use of different chambers each of its own construction, such being at present the usual type of plant and necessitating the construction of a separate building inclosing the different chambers and apparatus for their protection from the weather, etc. My invention being thus cheaper to build, more compact, and occupying less space for the same efficiency and capacity.

Figure 1 represents a top or plan view of a filtering plant embodying my invention. Fig. 2 represents a vertical section thereof on line $x$—$x$ Fig. 1. Fig. 3 represents a vertical section of a modification thereof.

Similar letters of reference indicate corresponding parts in the figures.

Referring to the drawings: A designates a filtering plant composed of the exterior walls B, the inner walls C, the base B′, of the walls B, and the bases C′ and C², of the walls C. These walls and bases form the sedimentation chamber D, the chambers E forming the filter or filters and the chambers F for the reception of the purified or filtered water, it being noticed that the chambers D surround the chambers E and F, the outer walls B thereof also acting as the walls of a building inclosing said filtration plant. The chambers E are in communication with the chambers D by means of the distributing main H which receives the sedimented or partially sedimented water from the chambers D, and distributes said water to the filter chambers E through the pipes H′ and J, the same being suitably controlled by valves such as at K.

In the present case, there is shown a plurality of filter chambers E, separated by the division walls L, but this plurality is not an essential principle of this plant as one or more chambers E by a suitable modification of the piping system, distributing the sedimented or partially sedimented water would act as well.

Connected with the bases C′ of the chambers E, are the pipes M, and the collecting system G, which open or discharge into the chambers F, being provided with suitable valves as at N.

It will now be seen that the water is first admitted into the chambers D, where being in a state of comparative quiet owing to its very slow passage through the chambers D, it is permitted to settle, the sediment thus being precipitated, as is evident, in said chamber, from which it may be removed from time to time as desired. The water, is thus partially purified by the time it has passed through the chambers D in its passage from the inlet L′ to the distributing main H, through which it passes and is distributed to the chambers E by means of the aforementioned pipes H and J, such distribution being controlled by suitable valves such as at K. The water passes through the chambers E, forming the filters, being thoroughly purified in such passage, and in this purified condition, it enters the chambers F, the valves N being duly opened. The purified or filtered water now occupies the chambers F, from where it may be pumped or directed to a place of use. It will also be seen that the walls C are common to the chambers D, E, and F, and the bases C′ are partitions or divisional walls common to the chambers E and F. By these means the expense of the construction of a filter plant is correspondingly reduced, and the plant being of compact form occupies considerably less space than where each chamber is separately constructed, as such separate construction necessitates the inclosure of said separately constructed chambers by a building to protect them from the weather, etc., which function of protection etc. is performed in my invention by the walls B, and the superstructure which they carry.

In Fig. 3, there is a reversal of the members of the plant, in that the filtering chambers E, and the chambers F for purified or filtered water, surround the sedimentation chamber D, the same certain walls and bases remaining common to adjacent chambers without producing different results from those in the previous case described.

Having thus described my invention, what I claim as new and desire to secure by Letters Patent, is:—

1. In a filtering plant, a sedimentation chamber, a connection therefrom to the water supply filtering chambers, one of the said chambers being entirely surrounded by the other, and the division walls of which are common to both chambers, chambers for the filtered water beneath said filtering chambers, and a distributing main in communication with the sedimentation chamber and above the filters in the filtering chambers.

2. In a filtering plant, a sedimentation chamber, a connection therefrom to the water supply filtering chambers, one of the said chambers being entirely surrounded by the other and the division walls of which are common to both chambers; chambers for the filtered water beneath said filtering chambers, a distributing main in . communication with the sedimentation chamber and above the filters in the filtering chambers, distributing pipes in the purified water chamber and distributing systems in the bases of the filtering chambers.

3. A filtering plant comprising exterior and inner walls, a base for the exterior walls, bases upon different levels, for the outer walls forming filtering chambers above and chambers for purified water beneath the latter and a sedimentation chamber, one entirely surrounding and inclosing the other, a connection from said sedimentation chamber to the water supply and a distributing main for distributing the water to the filtering chambers.

4. A filtering plant comprising exterior and inner walls, a base for the exterior walls, bases upon different levels, for the outer walls forming filtering chambers above and chambers for purified water beneath the latter and a sedimentation chamber, one entirely surrounding and inclosing the other, a connection from said sedimentation chamber to the water supply, a distributing main for distributing the water to the filtering chambers, branches leading from said distributing main, and means for simultaneously controlling all of said branches.

5. A filtering plant comprising exterior and inner walls, a base for the exterior walls, bases upon different levels, for the outer walls forming filtering chambers above and chambers for purified water beneath the latter and a sedimentation chamber, one entirely surrounding and inclosing the other, a connection from said sedimentation chamber to the water supply, a distributing main for distributing the water to the filtering chambers, a collecting system intermediate the filtering and purified water chambers and pipes leading from said collecting system into the purified water chambers.

6. A filtering plant comprising exterior and inner walls, a base for the exterior walls, bases upon different levels, for the outer walls forming filtering chambers above and chambers for purified water beneath the latter and a sedimentation chamber, one entirely surrounding and inclosing the other, a connection from said sedimentation chamber to the water supply, a distributing main for distributing the water to the filtering chambers, a collecting system intermediate the filtering and purified water chambers, pipes leading from said collecting system into the purified water chambers, valves in said pipes and means for simultaneously controlling them.

HAROLD D. ELFRETH.

Witnesses:
JOHN A. WIEDERSHEIM,
HARRY C. DALTON.